R. McCORKELL.
CORN PLANTER.
No 44,810. Patented Oct. 25, 1864.
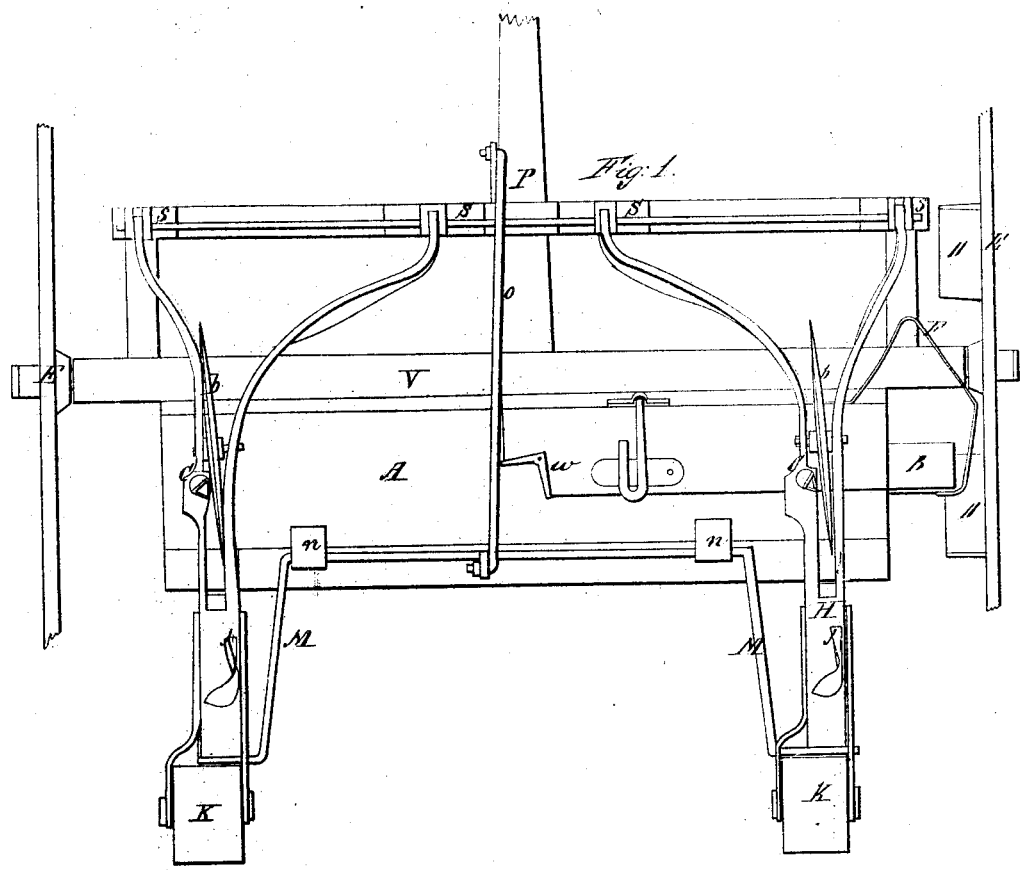
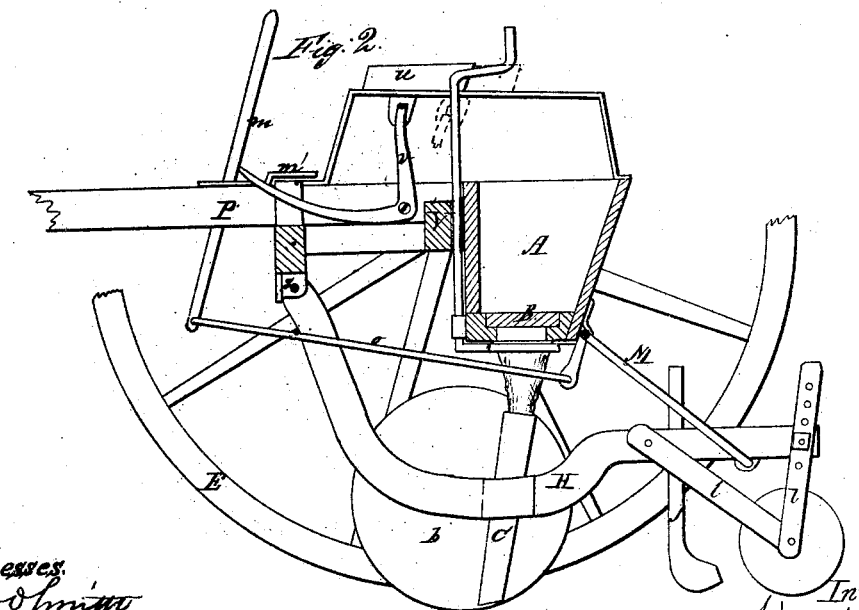
Witnesses:
Inventor:

UNITED STATES PATENT OFFICE.

ROBERT McCORKELL, OF WARSAW, MINNESOTA.

CORN-PLANTER.

Specification forming part of Letters Patent No. 44,810, dated October 25, 1864; antedated October 22, 1864.

*To all whom it may concern:*

Be it known that I, ROBERT McCORKELL, of Warsaw, in the county of Goodhue and State of Minnesota, have invented a new and Improved Machine for Planting Corn and other Seeds; and I do hereby declare that the following is a full, clear, and exact description of the construction and operation of the same, reference being had to the annexed drawings, making a part of this specification, in which—

Figure 1 is a rear end elevation, and Fig. 2 is a side section through.

The nature of my invention consists in furrowing, dropping, covering, and rolling two, three, or more rows at one time, the machine working either as an automaton or hand-dropper.

To enable others skilled in the art to make and use my machine or invention, I will proceed to describe its construction and operation.

My seed-hopper may be made in any convenient form, and is marked A. In this I place a partial bottom, with openings at the proper distances apart for the rows, at the side of each of which I place a brush to prevent more than the proper quantity of seed from passing out. Under this, and in a groove in the bottom, I place a slide, B, with holes corresponding to the openings in the partial bottom, and adjustable in size to the number of seeds to be dropped. These holes pass from the openings where they are filled to holes in the bottom where they are emptied, through tubes of gum or some other material, into a cylinder-tooth, C. This slide is worked by means of a cam, D, attached to certain spokes of the wheel E, pressing against the spring F, so as to shove the slide in, and is drawn back by the elasticity of the spring; or it may be worked by means of a hand-lever, G. The cam is so arranged that it strikes at equal distances, and may be fastened to the spokes of any common wagon-wheel, and thus cheapen the machine. The spring F is fastened to the hopper A, and is fastened or attached to the slide B, as seen in Fig. 1 of the drawings. The cylinder-tooth C is held in its place on an arm of the beam H. At the side of the tubular cylinder-tooth I place a rolling cutter (marked $b$) in such a position as to open a furrow and cut any weeds or stubble that might otherwise collect on the tubular cylinder-tooth so as to clog and prevent the machine from working, and also to prevent it from catching on rocks or roots, by raising it over them, or any other obstructions that may be in the way. Behind this, and on the other side of the beam, is a reversed shear, $j$, constructed in such a shape as to rise over any obstructions and not to gather weeds or stubble so as to clog the share, and is used for the purpose of turning a furrow to cover the seed.

$k$ is an adjustable roller, raised and lowered by means of the straps $l'$, bolted to the beam H, and is used for the twofold purpose of regulating the depth of planting and rolling the furrow.

M $m$ $m'$ are a series of levers, used for the purpose of raising the beams H, so as to lift the tooth and shares out of the ground and stop planting. M is a compound lever, fastened to the side and bottom of the hopper A by the strips $n$ $n$, and may be attached either above or below the parts to be lifted, or used to give a downward pressure, if desired. $m$ is a lever acting on M by means of a connecting-rod, $o$. $m'$ is a lever designed to hold $m$ in its place when it is acting on M, and thus hold the beams up. $m$ and $m'$ are attached to the pole P by bolts, as shown in the drawing Fig. 2 accompanying this specification. The hopper A is fastened to the back part or side of the axle V, and extends below, so as to shorten the drop and counterbalance the weight that may be thrown on the neck-yoke by the draft of the beams H on the lower side of the cross-bar $r$. The beams H are fastened to the cross-bar by a rod, bar, or bolt passing through lugs $s$, into which the arms of the beams are fitted, or may be fastened in any other may known to mechanics.

$u$ is a movable seat, placed on two bars or slats running parallel to each other, and is held on by means of a flange passing down between them, through which an open ring, pin, or bolt is placed to keep it down. To this flange is attached the end of a triangular-shaped lever, $v$, (or a lever of any other convenient form may be used,) the angle of which is fastened to some part below the seat, so that by pressure by the foot, hand, or in any other way the driver may move the seat back of the center of gravity, or forward, while he is seated in it. The object of this movable seat is to place the driver in such a position that his weight will counterbalance the weight of any other part of this or any other machine of a similar character, whether it is in working gear or not.

$w$ is a lever screwed on the bottom of the hopper and attached at one end to the spring F or slide B by a wire and at the other in the same way to the lever $m$, so as to draw the spring off the wheel and stop the motion of the slide B and prevent the dropping when the machine is not in the ground.

Some of the advantages of my machine over others in common use are the number of rows that may be planted at a time, it being capable of planting three or four, each planter being independent of the others. Another is the combination of the rolling cutter at the side of the cylinder-tooth, so that it opens the furrow and protects the tooth, and thus saves the friction of drawing a runner or shoe in the ground, and the adjustable roller to regulate the depth of planting, so as to suit any ground or season, it being important to plant deep when the ground is dry, and shallow when it is wet.

The combination of levers by which the planters are lifted out of the ground, which may also be used to give a downward pressure when it is desirable to roll the ground harder on the top of the corn, and the mode of adjusting the seat, so as to place the driver in such position that his weight will balance the machine whether working or not. In addition to these my planter may be attached to the hind axle of any wagon by substituting the reach for a tongue and fastening the cross-bar $r$ to the hounds, thereby reducing the price of the machine.

What I claim, and desire to secure by Letters Patent, is not the movable seat *per se*, but—

1. The device or manner of moving it by the lever $v$, operated by the foot when used in cornplanters, as specified.

2. The hinged beam H, the tubular tooth C, the oblique rotary colter $b$, the reversed share $j$, and adjustable roller $k$, arranged as and for the purpose set forth.

3. The levers M M and $m$, with the connecting-rod $o$, for the purpose of elevating or depressing the beams H H, with their use for that purpose, as set forth and described.

ROBERT McCORKELL.

Witnesses:
 EDM. F. BROWN,
 CHAS. McD. BROWN.